United States Patent
Pazerini

(10) Patent No.: US 10,962,045 B2
(45) Date of Patent: Mar. 30, 2021

(54) POOL CLEANING ROBOT MOTOR SECURING MECHANISM

(71) Applicant: MAYTRONICS LTD., Kibbutz Yizrael (IL)

(72) Inventor: Danny Pazerini, Kiryat Ata (IL)

(73) Assignee: MAYTRONICS LTD., Kibbutz Yizrael (IL)

(*) Notice: Subject to any disclaimer, the term of this patent is extended or adjusted under 35 U.S.C. 154(b) by 293 days.

(21) Appl. No.: 16/218,504

(22) Filed: Dec. 13, 2018

(65) Prior Publication Data

US 2019/0186528 A1    Jun. 20, 2019

Related U.S. Application Data

(60) Provisional application No. 62/598,055, filed on Dec. 13, 2017.

(51) Int. Cl.
*F16B 39/282*    (2006.01)
*E04H 4/16*    (2006.01)

(52) U.S. Cl.
CPC ......... *F16B 39/282* (2013.01); *E04H 4/1654* (2013.01)

(58) Field of Classification Search
CPC ...... F16B 39/282; F16B 39/286; F16B 39/32; E04H 4/1654; Y10S 411/949
USPC ............. 411/7, 326, 335, 949–950, 961, 977
See application file for complete search history.

(56) References Cited

U.S. PATENT DOCUMENTS

| | | | | |
|---|---|---|---|---|
| 467,324 A * | 1/1892 | Raybuck | | F16B 39/32 411/114 |
| 474,731 A * | 5/1892 | Galbraith | | F16B 39/24 411/160 |
| 1,106,248 A * | 8/1914 | Simpson | | F16B 39/24 411/145 |
| 1,181,494 A * | 5/1916 | Warren et al. | | F16B 39/32 411/114 |
| 1,757,924 A * | 5/1930 | Cole | | F16B 39/32 411/329 |
| 2,037,586 A * | 4/1936 | Olson | | F16B 39/282 411/188 |
| 2,999,489 A * | 9/1961 | Coughlin | | F02N 5/02 123/185.14 |
| 3,008,159 A * | 11/1961 | Del Vecchio | | E04H 4/1636 15/1.7 |
| 3,254,355 A * | 6/1966 | Shaw | | E04H 4/1654 15/1.7 |

(Continued)

FOREIGN PATENT DOCUMENTS

WO    2009/081060 A2    7/2009
WO    2009/156268 A1    12/2009
WO    2011/003526 A2    1/2011

*Primary Examiner* — Roberta S Delisle
(74) *Attorney, Agent, or Firm* — Reches Patent

(57) ABSTRACT

A kit that may include a locking unit and an external portion of a motor housing; wherein the locking unit comprises a threaded opening and first securing elements; wherein the external element comprises an opening and second securing elements; wherein the threaded opening is shaped and positioned to mesh, in a coaxial manner, with a thread that is mechanically coupled to an axis of a motor; wherein the first securing elements and the second securing elements are shaped and positioned to mesh with each other and prevent a rotational movement between the first securing elements and the second securing elements.

16 Claims, 8 Drawing Sheets

(56) References Cited

U.S. PATENT DOCUMENTS

| | | | | |
|---|---|---|---|---|
| 3,752,203 | A * | 8/1973 | Hill, Jr. | F16B 39/282 411/185 |
| 4,220,188 | A * | 9/1980 | McMurray | F16B 39/282 411/188 |
| 4,290,469 | A * | 9/1981 | Nakae | F16B 39/282 411/185 |
| 5,093,950 | A * | 3/1992 | Heier | E04H 4/1654 15/1.7 |
| 6,730,066 | B1 * | 5/2004 | Bennwik | A61M 11/00 222/94 |
| 7,497,653 | B2 * | 3/2009 | Harris | F16B 39/24 411/150 |
| D698,234 | S * | 1/2014 | Bauer | D8/397 |
| 2006/0216129 | A1 * | 9/2006 | Lin | F16B 39/282 411/161 |
| 2007/0128003 | A1 * | 6/2007 | Shiu | F16B 39/282 411/533 |
| 2009/0245969 | A1 * | 10/2009 | White | F16C 25/06 411/215 |
| 2014/0348609 | A1 * | 11/2014 | Chen | F16B 41/005 411/209 |

* cited by examiner

POOL CLEANING ROBOT MOTOR SECURING MECHANISM

BACKGROUND

Pool cleaning robots include various motors such as a pump motor and a drive motor. The pump motor may rotate an impeller for controlling the flow of fluid within the pool cleaning robot (for example during a filtering process) and/or even the flow of fluid outside the pool cleaning robot (for example—as a part of a fluid propulsion process). The drive motor may indirectly rotate wheels and/or tracks that are used to move the pool cleaning robot.

The drive motor may rotate a motor axis. A gear may be connected to the motor axis and be rotated by the motor.

These is a growing need to prevent the motor unit from moving due to the rotation of the motor axis.

There is a further need to streamline production, reduce costs and avoid use of aggressive chemicals in production settings.

SUMMARY

There may be provided a kit that may include a locking unit and an external portion of a motor housing; wherein the locking unit may include a threaded opening and first securing elements; wherein the external element may include an opening and second securing elements; wherein the threaded opening may be shaped and positioned to mesh, in a coaxial manner, with a thread that may be mechanically coupled to an axis of a motor; wherein the first securing elements and the second securing elements may be shaped and positioned to mesh with each other and prevent a rotational movement between the first securing elements and the second securing elements.

The first securing elements may include first teeth that may form a first annular array; and wherein the second securing elements may include second teeth that may be arranged in a second annular array.

The first teeth may form sawtooth array and wherein the second teeth may form an inverse sawtooth array.

The first teeth may extend below a lower apertured surface of the locking unit; and wherein the second teeth may extend above an upper apertured surface of the external portion of the housing.

The first teeth may be surrounded by the second teeth.

The first annular array and the second annular array may be concentric.

A group of first teeth may be integrated with a movable portion of the locking unit, wherein the movable portion may be configured to move between (a) a first position in which the group of the first teeth mesh with a corresponding group of second teeth; and (b) a second position in which the group of the first teeth may be spaced apart from the corresponding group of second teeth.

Another group of first teeth may mesh with a corresponding other group of second teeth regardless of a position of the movable portion.

The movable portion may be connected to a spring. The spring may be a quick locking unit release.

The locking unit may include a lower apertured body that may include stress relief apertures.

The locking unit may include a flexible lower apertured surface.

The first locking elements and the second locking elements may form a zip tie handcuff.

may be a rotation of the locking unit against the external portion of the motor housing results in an incremental advance of the first locking elements against the second locking elements.

The first and second locking elements may form a pair of interlocking arrays.

A method for reducing rotations of a motor within a motor housing, the method may include: securing a locking unit to (a) a thread that may be mechanically coupled to the motor, wherein the thread and the locking element may be coaxial, and to (b) an external portion of the motor housing, wherein the securing may include meshing first securing elements of the locking element to second securing elements of the external portion of the motor housing thereby preventing a rotational movement between the first securing elements and the second securing elements.

The first securing elements may include first teeth that may form a first annular array; and wherein the second securing elements may include second teeth that may be arranged in a second annular array.

The first teeth may form sawtooth array and wherein the second teeth may form a inverse sawtooth array.

The first teeth may extend below a lower apertured surface of the locking unit; and wherein the second teeth may extend above an upper apertured surface of the external portion of the housing.

The first teeth may be surrounded by the second teeth.

The first annular array and the second annular array may be concentric.

A group of first teeth may be integrated with a movable portion of the locking unit, wherein the movable portion may be configured to move between (a) a first position in which the group of the first teeth mesh with a corresponding group of second teeth; and (b) a second position in which the group of the first teeth may be spaced apart from the corresponding group of second teeth.

Another group of first teeth may mesh with a corresponding other group of second teeth regardless of a position of the movable portion.

The movable portion may be connected to a spring.

The locking unit may include a lower apertured body that may include stress relief apertures.

The locking unit may include a flexible lower apertured surface.

The first locking elements and the second locking elements may form a zip tie handcuff.

A rotation of the locking unit against the external portion of the motor housing results in an incremental advance of the first locking elements against the second locking elements.

The first and second locking elements may form a pair of interlocking arrays.

BRIEF DESCRIPTION OF THE DRAWINGS

In order to understand the invention and to see how it may be carried out in practice, a preferred embodiment will now be described, by way of non-limiting example only, with reference to the accompanying drawings.

DETAILED DESCRIPTION OF THE DRAWINGS

Figure 1:
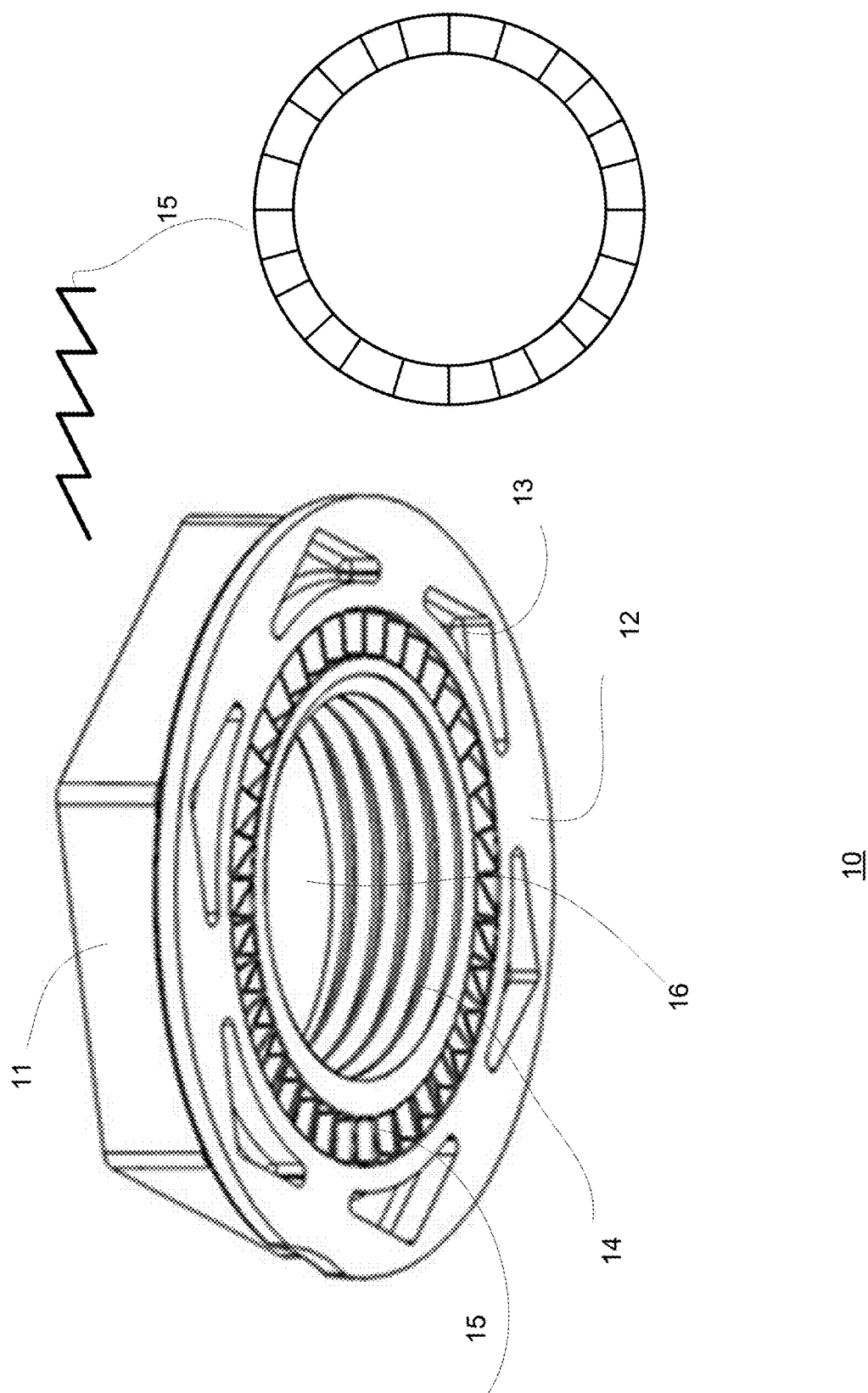
FIG. 1 is an example of a locking unit.

The term "and/or" is additionally or alternatively.

There is provided a locking unit and a motor housing that may secure a motor of a pool cleaning robot—and especially prevent the rotation of the motor within the motor housing.

The motor has an axis that is rotated by the motor. The axis is coupled to and rotates a gear. The motor and/or the axis have external threads that may fit an internal thread of the locking unit. The motor and/or axis may pass through an opening of the motor housing and may contact a limiter for reducing the rotation of the motor within the motor housing.

The locking unit may prevent the motor housing from rotating and may function as a lock washer.

The locking unit mechanism is similar to that of a zip tie disposable plastic handcuff, where each manual locking rotation movement of the teeth (15) of the octagonal body (11) against the teeth (25) incrementally advances each protuberance one locking notch. Each advance of the locking notch may represent a pre-set locking torque that may be achieved by counting the "clicks" while manually turning the nut (11). High locking torques are effortlessly achieved using this said locking mechanism. Moreover, a quick spring release mechanism may be incorporated into the locking mechanism.

The locking unit has a set of first securing elements (such as first protuberances—especially first teeth) and the locking unit has a set of second securing elements (such as second protuberances—especially second teeth). When the first securing elements meshes with the second securing elements the rotation movement between the locking element and the motor housing is prevented.

The locking unit is meant to lock the motor to the second securing element

The following figures illustrates the first and second securing elements as being arranged in a radial symmetrical manner about the axis of the motor (when said axis is inserted in the locking unit and a motor housing. The first and second securing elements may partially of fully fill an annular region.

The first and second securing elements may be rigid or flexible. When using rigid first and second securing elements then the release of the locking element from the motor housing may involve deforming or even breaking one of the sets of securing elements.

When at least one of the first and second securing elements are flexible then the release process may involve moving the first securing elements from the second securing elements- or vice-versa.

The locking element can be made of plastic, metal or any other durable material. By substituting the present trend towards using brass made components and using plastic/polymer components provides a locking element that does not corrode or change its color over time. Savings in costs are achieved by eliminating usage of securing and/or anti vibration glues, that are both expensive and chemically aggressive. The locking unit 10 may alternatively be locked and secured in place manually thereby avoiding expensive torque tools that are time consuming and require a locking moment ranging, for example, 3 or up to 14 Nm, depending on the motor, its size, force and location in pool cleaning robot.

Manual locking permits easily releasing and re-assembling of motors, inside a pool-cleaning robot, in production lines, in do-it-yourself repair or after sale technical service environments.

FIG. 1 is an example of a locking unit 10. Locking unit 10 includes an octagonal body 11 (it may include a body of any other shape) that has a threaded opening 16 (the threads are denoted 14), a lower apertured surface 12 (apertures 13 are formed in the lower apertured surface) and a set of first securing elements—such as teeth 15 that are positioned within an annular region that surrounds an opening 16. The apertures may be shaped in any shape and size and may be pressure relief apertures that enable the exterior and the interior of the lower apertures surface to slightly move towards each other. Teeth 15 form an annular array. In FIG. 1 the teeth are oriented in a counterclockwise manner—to form a sawtooth array—wherein each sawtooth has a right slope that is steeper than its left slope. Teeth 15 extend downwards. FIG. 1 also illustrates a cross sectional view and a schematic top view of the teeth.

Figure 2:
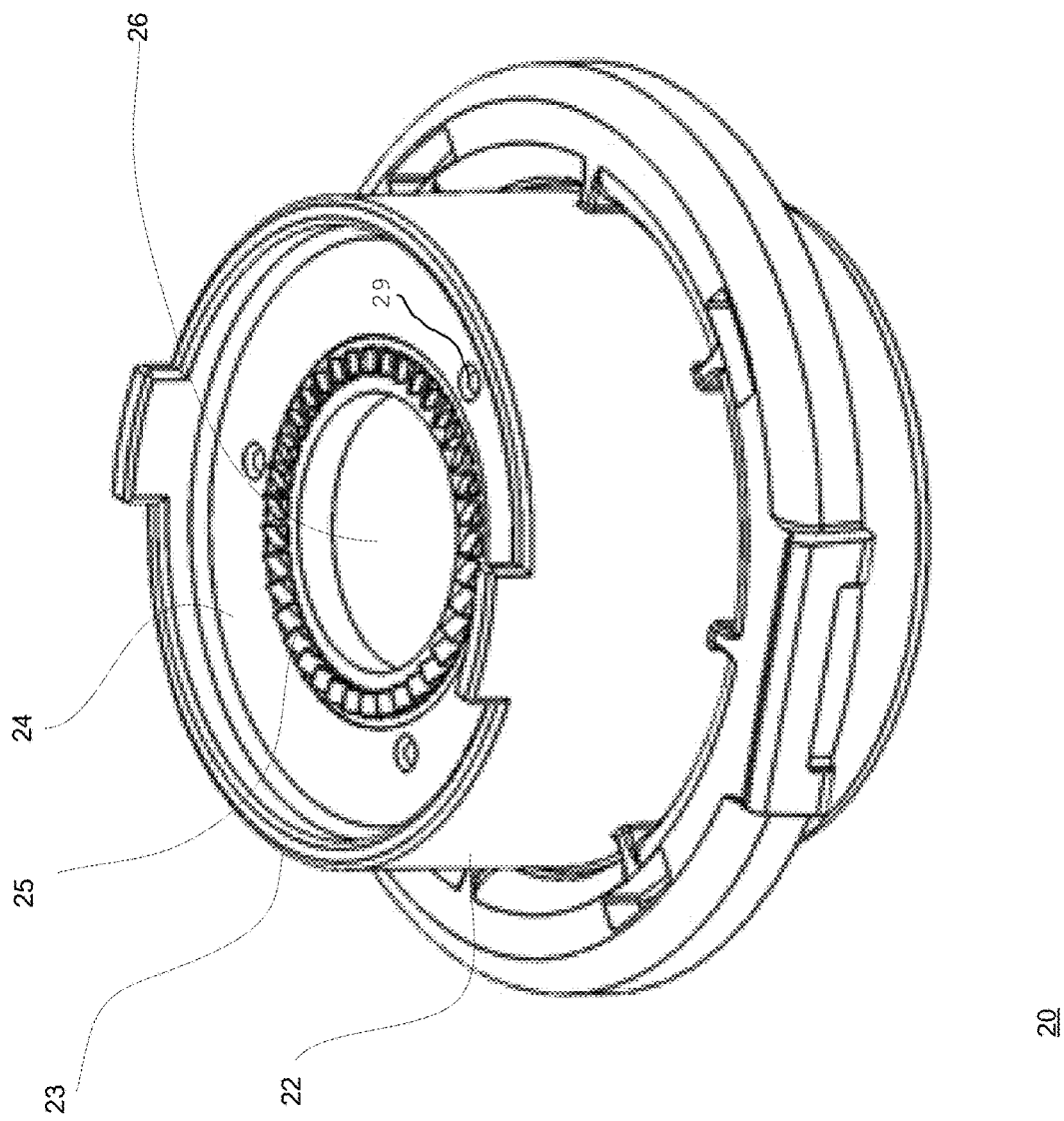
FIG. 2 is an example of a motor housing.

FIG. 2 is an example of an external portion 20 of a motor housing. The external portion 20 of the motor housing 20 includes body 22, opening 26, annular surface 24, and a set of second securing elements—such as teeth 25 that are positioned within an annular region that surrounds opening 26. Teeth 25 form an annular array. In FIG. 1 the teeth 25 are oriented in a clockwise manner—to form an inverse sawtooth array—wherein each sawtooth has a left slope that is steeper than its left slope. Teeth 25 extend upwards and are positioned between annular surface 24 and opening 26. The external part 20 of the motor housing may also have apertures 29 through which securing elements may pass and secure the external portion of the motor housing to another part of the motor.

It should be noted that teeth 15 and teeth 25 may not form a full annular array—but may also form only segments of the annular array. It should be noted that the first and second securing elements may be shaped in other shapes—as long as them mesh with each other and prevent unwanted rotations or at least damper unwanted rotations of the motor within the motor housing. It should be noted that the first and second securing elements may have any other shape.

Figure 3:
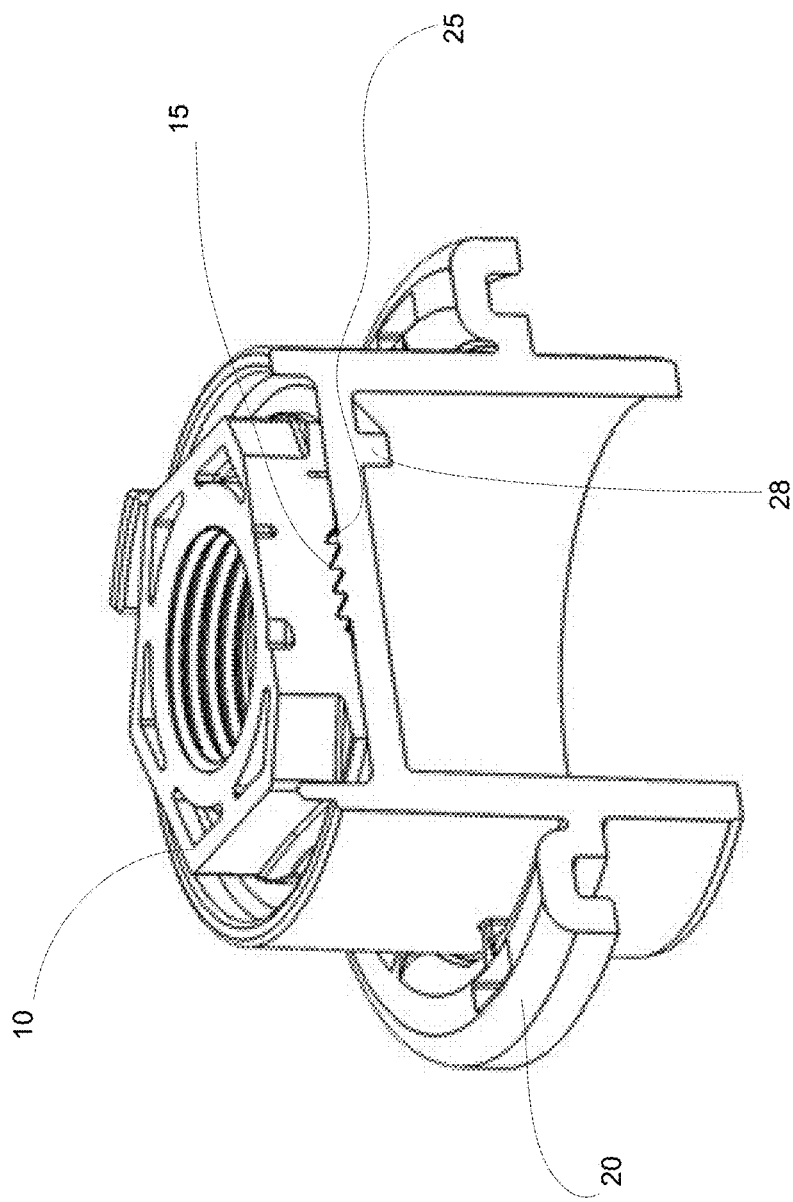
FIG. 3 is an example of a locking unit that meshes with the motor housing.

FIG. 3 is an example of a locking unit that meshes with the external portion of the motor housing. FIG. 3 illustrates that the first securing elements 15 and the second securing elements 25 are locked—and prevent a rotational movement of the external portion of the motor housing and releasing of the first securing element or unit. FIG. 3 also illustrated a limiter 28. The limiter 28 is illustrated as a two parallel lines that contact a linear facet of the motor which serve to limit motor rotational movement or torsion.

Figure 4:
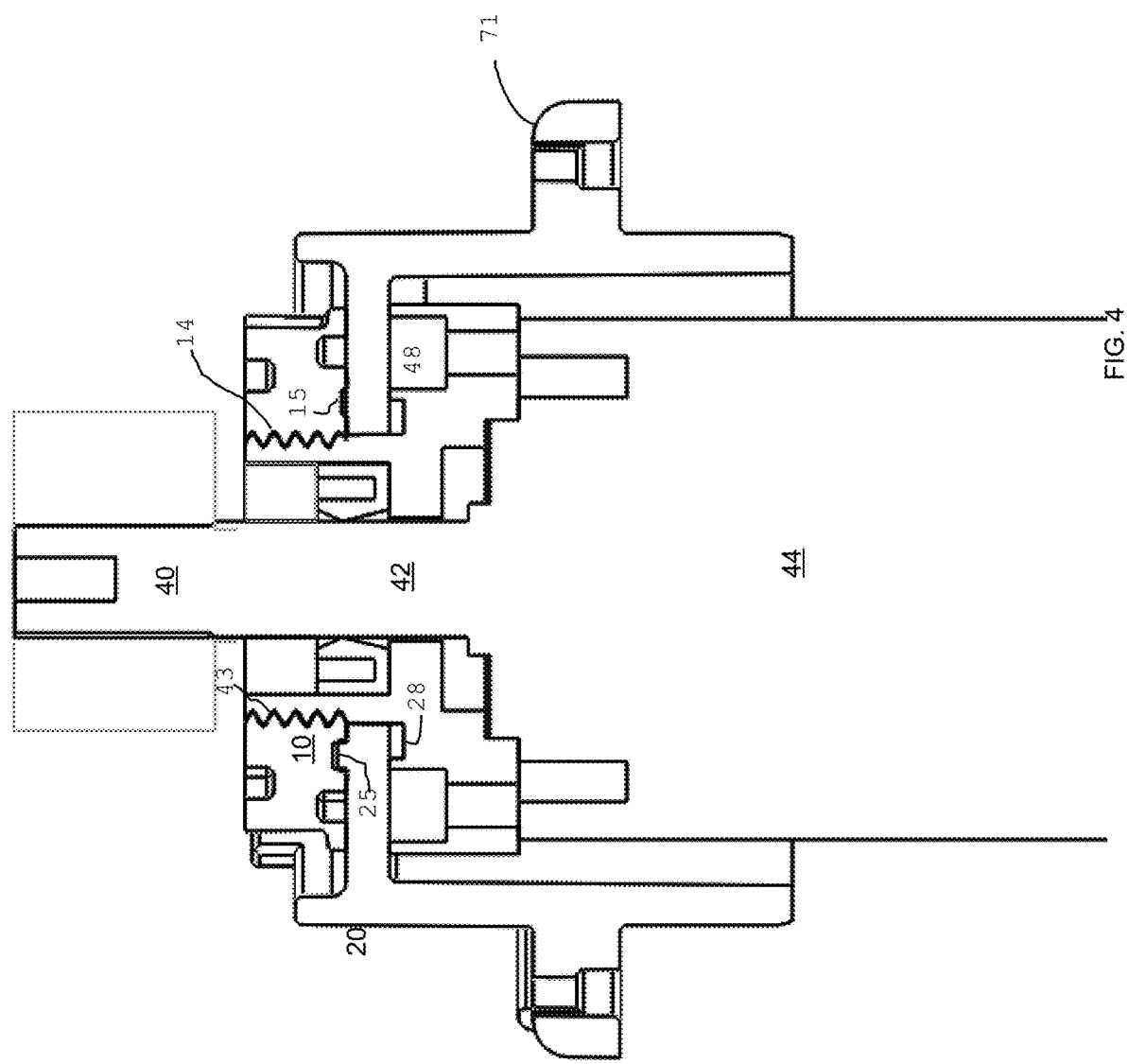
FIG. 4 is an example of a locking unit that meshes with the motor housing and with a drive motor that is connected to a gear.
Figure 5:
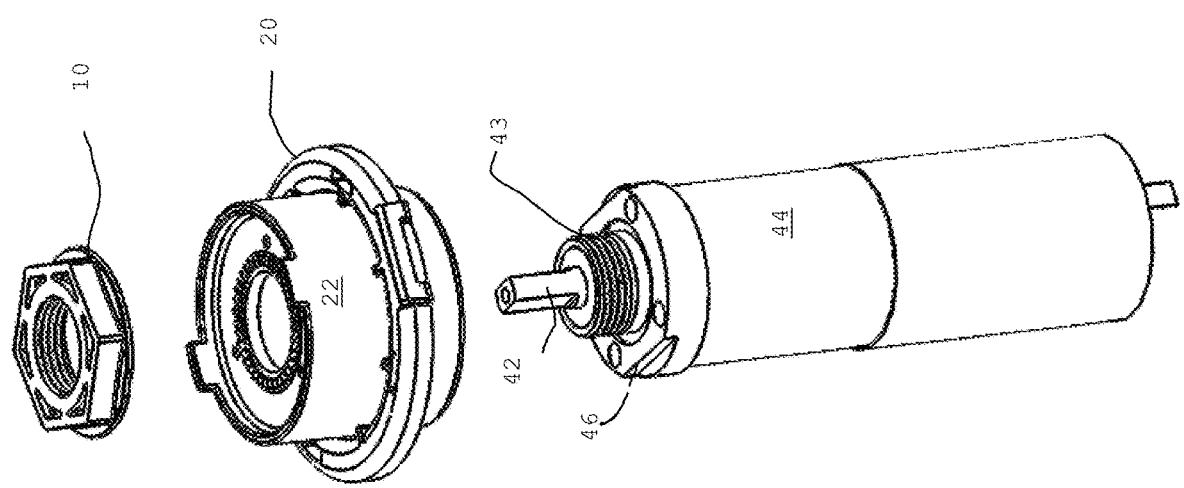
FIG. 5 is an exploded view of a locking unit and of a motor housing.

FIG. 4 is an example of locking unit 10 that meshes with the external portion 20 of the motor housing and with drive or pump motor 44 that is connected to a rod 42 that extends out of a threaded cylinder 42. The opening 26 of the motor housing FIG. 5 is an exploded view of locking unit 10, the external portion 20 of the motor housing and drive or pump motor 44.

Figure 6:
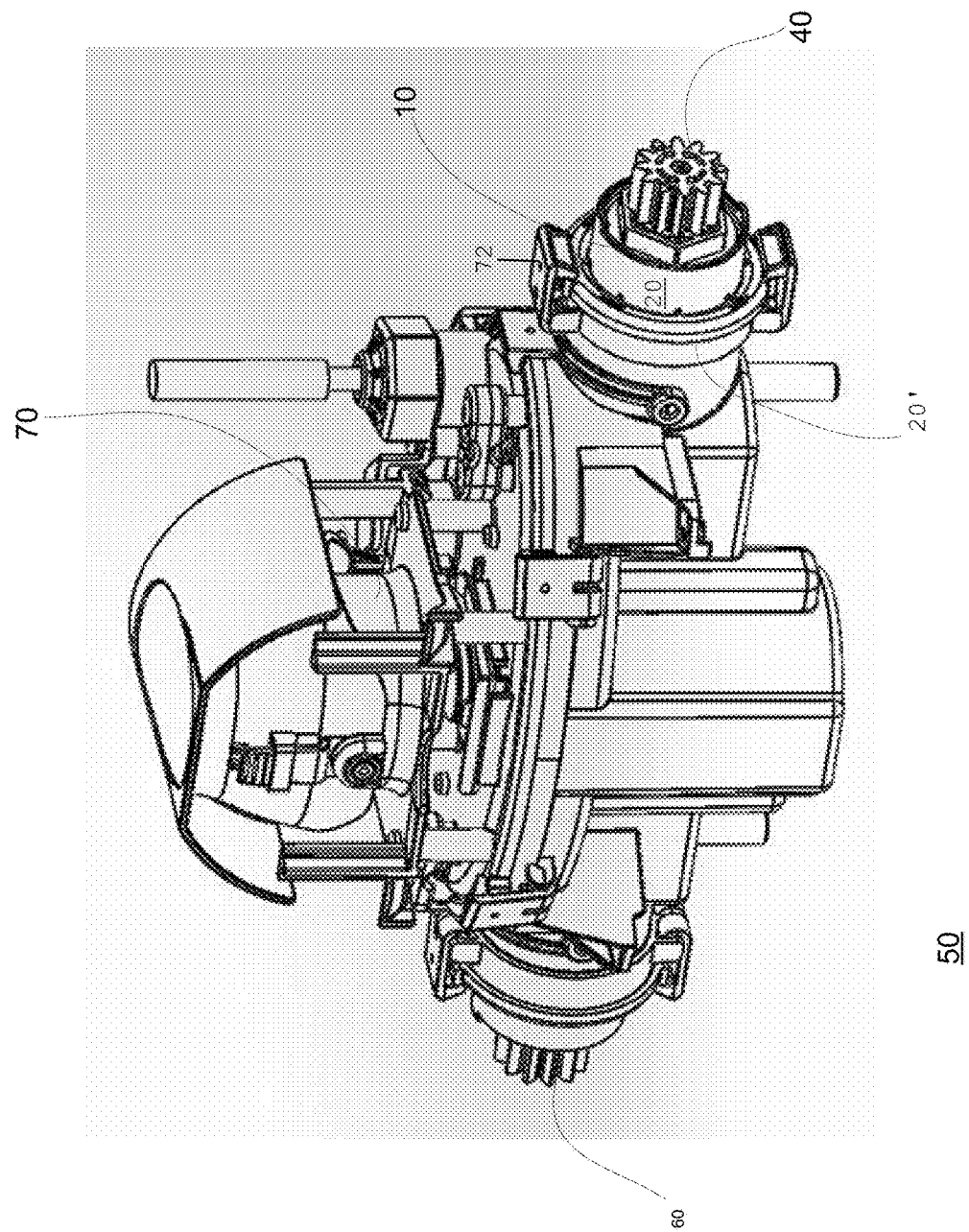
FIG. 6 is an example of part of a pool cleaning robot.

FIG. 6 is an example of a part of a pool cleaning robot. This part includes multiple motors—whereon the unwanted rotation of any of said motors within their housing may be stopped or at least reduced. In addition to the multiple motors there may be provided gears 40 and 60, pump motor cover 70 (pump motor not shown), locking unit 10, external part 20 of a motor housing 20, internal portion 20' of the motor housing and a clamp 72 that holds the external portion to the internal portion—and even presses teeth 15 against teeth 25. The part of FIG. 6 is included within a housing of the pool cleaning robot.

Figure 7:
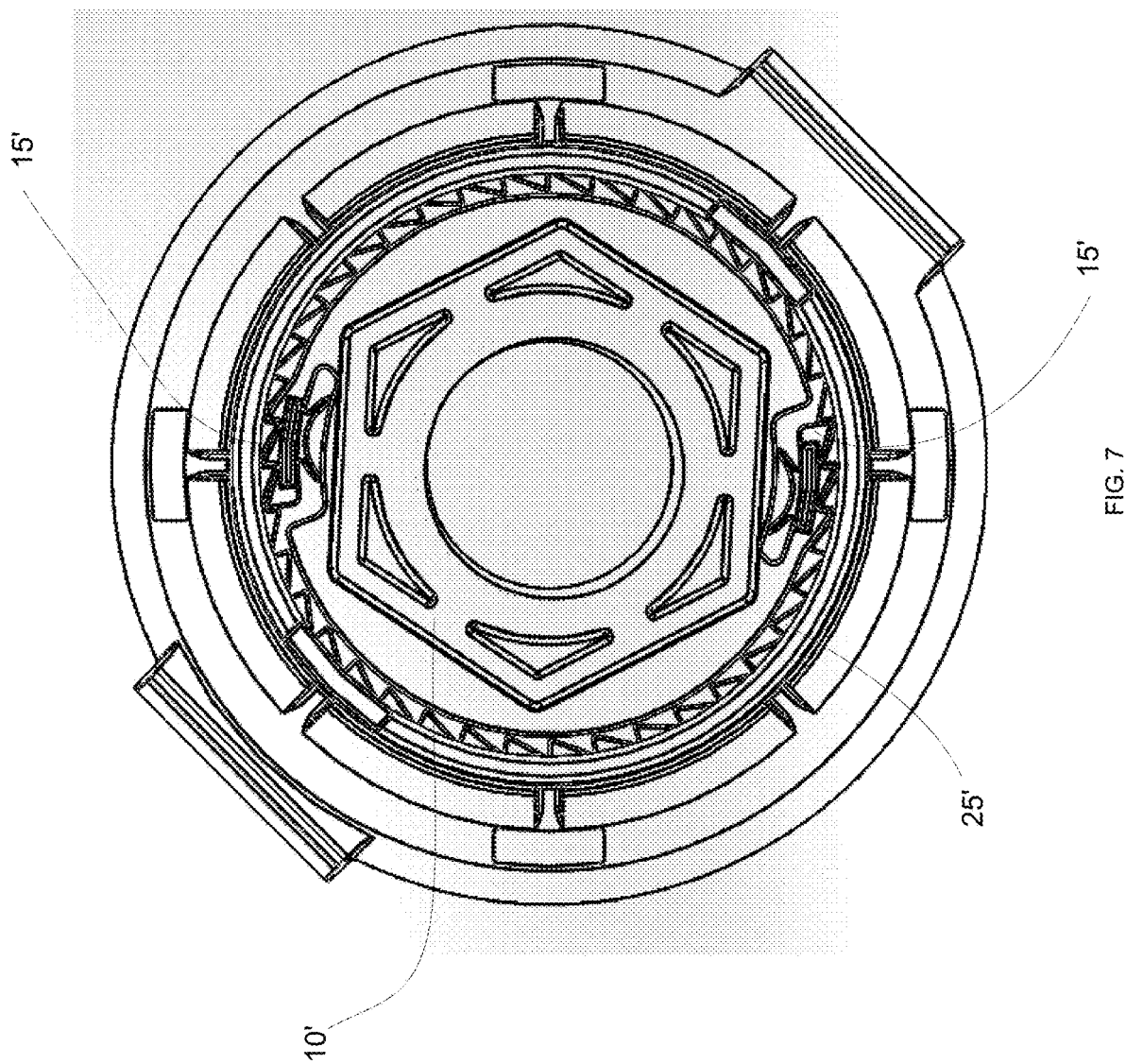
FIG. 7 is an example of a locking unit.
Figure 8:
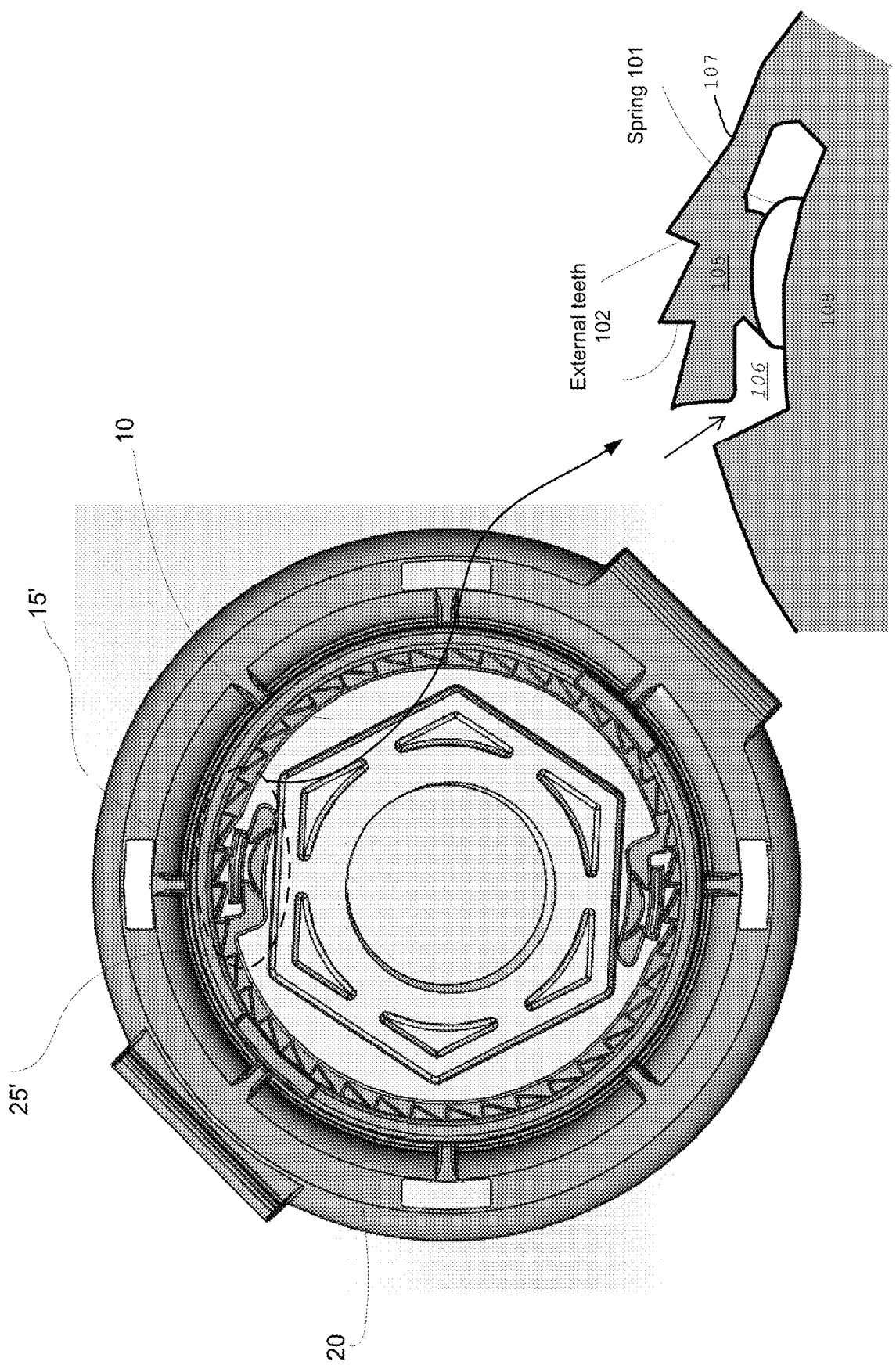
FIG. 8 is an example of a locking unit.

FIG. 7 is an example of a locking unit and FIG. 8 is another example of a locking unit that includes a, spring operated, quick reversible release mechanism of the locking unit. It is important for the event when a too high locking torque or not the specified number of notches or "clicks" was mistakenly reached. In these figures the first securing elements are included in a flexible region of the locking unit 10 and may be pushed away (inwards) from the second securing elements of the motor housing. The second securing elements of FIGS. 7 and 8 are not positioned below the first securing elements (as illustrated in FIGS. 2 and 3)—but surround the locking unit 10 and are directed towards an imaginary center of the locking unit.(another embodiment). A flexible spring 101 may be pressed manually towards the said center thereby releasing the locking unit 10 from said external teeth 102. This allows releasing the assembly and opening of the locking unit. In FIG. 8 some teeth 15' are formed in a region 105. Region 107 is connected to (a) a neck 107 that connects the region 105 to a main part of the locking unit 10 and to (b) spring 106 that also may connect the main part. When the region 107 is forced to move towards the main part (and away from the teeth 25')—the spring is squeezed towards the main body and at least some of the teeth 15' are spaced apart from teeth 25' and this allows to easily remove the locking unit from the external portion of the motor housing. The region and/or spring and/or neck should be flexible. When the spring is not forced away from teeth 25' the spring forces teeth 15' against teeth 25'. It should be noted that there may be multiple regions around the periphery of the locking unit.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a pool cleaning robot as including a certain component should also cover the scenario in which the pool cleaning robot does not include the certain component. For example—any reference to a method as including a certain step should also cover the scenario in which the method does not include the certain component. Yet for another example—any reference to a pool cleaning robot that is configured to perform a certain operation should also cover the scenario in which the pool cleaning robot is not configured to perform the certain operation.

The terms "pool cleaner" and "pool cleaning robot" are used in an autonomous manner and may refer to a self-propelled pool cleaner.

The terms "including", "comprising", "having", "consisting" and "consisting essentially of" are used in an interchangeable manner.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit of components that is illustrated in any of the figures and/or specification and/or the claims may be provided.

Any combination of any components illustrated in any of the figures and/or specification and/or the claims may be provided.

Any combination of any set of components illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

I claim:

1. A kit that comprises a locking unit and an external portion of a motor housing;

wherein the locking unit comprises a threaded opening and first securing elements;

wherein the external element comprises an opening and second securing elements;

wherein the threaded opening is shaped and positioned to mesh, in a coaxial manner, with a thread that is mechanically coupled to an axis of a motor;

wherein the first securing elements and the second securing elements are shaped and positioned to mesh with each other and prevent a rotational movement between the first securing elements and the second securing elements;

wherein the first securing elements comprise first teeth that form a first annular array; and wherein the second securing elements comprise second teeth that are arranged in a second annular array;

wherein the first teeth extend below a lower apertured surface of the locking unit; and wherein the second teeth extend above an upper apertured surface of the external portion of the housing.

2. The kit according to claim 1 wherein the first teeth form sawtooth array and wherein the second teeth form a inverse sawtooth array.

3. The kit according to claim 1 wherein the first teeth are surrounded by the second teeth.

4. The kit according to claim 1 wherein the first annular array and the second annular array are concentric.

5. The kit according to claim 1 wherein a group of first teeth are integrated with a movable portion of the locking unit, wherein the movable portion is configured to move between (a) a first position in which the group of the first teeth mesh with a corresponding group of second teeth; and (b) a second position in which the group of the first teeth are spaced apart from the corresponding group of second teeth.

6. The kit according to claim 5 wherein another group of first teeth mesh with a corresponding other group of second teeth regardless of a position of the movable portion.

7. The kit according to claim 5 wherein the movable portion is connected to a spring.

8. The kit according to claim 1 wherein the locking unit comprises a lower apertured body that comprises stress relief apertures.

9. The kit according to claim 1 wherein the locking unit comprises a flexible lower apertured surface.

10. The kit according to claim 1 wherein the first locking elements and the second locking elements form a zip tie handcuff.

11. The kit according to claim 1 wherein a rotation of the locking unit against the external portion of the motor housing results in an incremental advance of the first locking elements against the second locking elements.

12. The kit according to claim 1 wherein the first and second locking elements form a pair of interlocking arrays.

13. A method for reducing rotations of a motor within a motor housing, the method comprises:

securing a locking unit to (a) a thread that is mechanically coupled to the motor, wherein the thread and the locking element are coaxial, and to (b) an external portion of the motor housing, wherein the securing comprises meshing first securing elements of the locking element to second securing elements of the external portion of the motor housing thereby preventing a rotational movement between the first securing elements and the second securing elements;

wherein the first securing elements comprise first teeth that form a first annular array; and wherein the second securing elements comprise second teeth that are arranged in a second annular array;

wherein the first teeth extend below a lower apertured surface of the locking unit; and wherein the second teeth extend above an upper apertured surface of the external portion of the housing.

14. The method according to claim 13 wherein the first teeth form sawtooth array and wherein the second teeth form a inverse sawtooth array.

15. The method according to claim 13 wherein the first teeth are surrounded by the second teeth.

16. The method according to claim 13 wherein the first annular array and the second annular array are concentric.

* * * * *